No. 859,540. PATENTED JULY 9, 1907.
W. R. BONNELL.
TRAP.
APPLICATION FILED MAY 7, 1906.

WITNESSES:
Ralph Lancaster
E. A. Pell

INVENTOR
William R. Bonnell
BY
Wm H. Canfield
ATTORNEY

THE NORRIS PETERS CO., WASHINGTON, D. C.

UNITED STATES PATENT OFFICE.

WILLIAM R. BONNELL, OF ELIZABETH, NEW JERSEY.

TRAP.

No. 859,540.    Specification of Letters Patent.    Patented July 9, 1907.

Application filed May 7, 1906. Serial No. 315,515.

*To all whom it may concern:*

Be it known that I, WILLIAM R. BONNELL, a citizen of the United States, residing at Elizabeth, in the county of Union and State of New Jersey, have invented certain new and useful Improvements in Traps; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention is a trap or valve that is adapted to be placed in any situation where water is to be drained off, but any gas or water is automatically prevented from coming backward through the valve. This kind of valve is particularly adapted to cellars and also sinks, and it comprises a casing having a valve seat near the top, one near the bottom, and a valve, preferably in the shape of a ball, that normally rests on the bottom valve seat to make it gas tight, the valve floating in water to allow water to run off, and also being floated back against the upper valve seat when there is a back pressure of water.

The invention is illustrated in the accompanying drawings, in which

Figure 1:
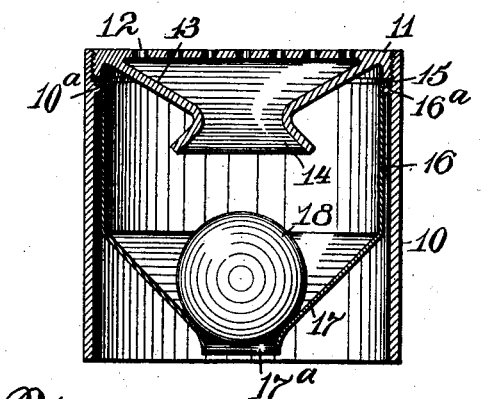
Figure 2:
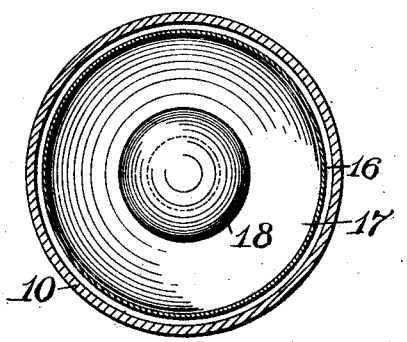

Figure 1 is a central vertical section of my valve or trap illustrated as a cellar trap, and Fig. 2 is a horizontal section directly above the ball.

I show in the preferred form, a circular casing 10 in the top of which screws the member 11 that is provided with the perforations 12, to allow the water in cellars and so forth to drain through. Suitably secured or integral with the member 11, is the tapered portion 13 having the opening 14 forming an upper valve seat.

The member 11 screws down against a washer or gasket 15 that rests on the turned over edge 16ᵃ of the can 16, this turned over edge in turn resting on the flange 10ᵃ on the interior of the casing 10.

It will be seen from this construction that by the screwing down of the member 11, a water and gas tight joint is made. The can 16 thus suspended, is provided with the tapered portion 17 having the perforation 17′ thus forming the lower valve seat. A ball or float 18 is placed between the two valve seats, as shown in Fig. 1, and this ball can be made of any material that will float in water.

When the device is in an operative position, water coming in any volume through the perforations 12, will pass down inside the can 16, float the ball or valve 18, and pass out through the opening 17′. It will thus be seen that the valve does not interfere with the ready passing off of fluid, but when the fluid is gone, it rests securely on the lower valve seat to make a gas tight joint. A little water would probably remain surrounding the ball and completing the seal. If the water in the cellar drain should be made to back up, for any reason, the pall 18 would be forced against the upper valve seat, and thus effectively prevent the flow of any water.

Modifications of construction might be employed, such as the attachment of the can 16 to the casing 10, or, if desired, the tapered portion 17, that is the lower valve seat in Fig. 1, might be made integral with the casing 10.

Having thus described my invention, what I claim is:—

A valve of the kind described comprising a casing, perforated plate secured in the casing having a valve seat attached to it on its bottom side, an internal flange on the casing, a can having an over lapping edge on the flange, a gasket between the perforated plate and the upper edge of the can, lower inclined walls on the can to form a lower valve seat, and a floating valve to normally seat itself on the lower valve seat.

In testimony, that I claim the foregoing, I have hereunto set my hand this 28th day of April 1906.

WILLIAM R. BONNELL.

Witnesses:
E. A. PELL,
WM. H. CAMFIELD.